United States Patent
Tashiro (10) Patent No.: US 6,844,642 B2
(45) Date of Patent: Jan. 18, 2005

(54) SPINDLE MOTOR FOR HARD DISC DRIVE WITH STATIC CHARGE DISCHARGING

(75) Inventor: Tomoyuki Tashiro, Fujieda (JP)

(73) Assignee: Victor Company of Japan, Ltd. (JP)

( * ) Notice: Subject to any disclaimer, the term of this patent is extended or adjusted under 35 U.S.C. 154(b) by 217 days.

(21) Appl. No.: 10/214,163

(22) Filed: Aug. 8, 2002

(65) Prior Publication Data
US 2003/0030340 A1 Feb. 13, 2003

(51) Int. Cl.[7] .............................................. H02K 5/173
(52) U.S. Cl. ...................... 310/90; 310/71; 360/271.1; 360/99.07; 384/517
(58) Field of Search .............................. 310/90, 71, 51, 310/67 R; 360/98.07, 99.03, 99.04, 99.07, 99.08, 271.1; 384/9, 627, 517, 518

(56) References Cited

U.S. PATENT DOCUMENTS 4,564,876 A * 1/1986 Takahashi et al. ......... 360/291.6

FOREIGN PATENT DOCUMENTS

| JP | 08-098450 | * | 4/1996 | .......... H02K/5/173 |
| JP | 2003-061300 | * | 2/2003 | .......... H02K/5/173 |

* cited by examiner

Primary Examiner—Karl Tamai
(74) Attorney, Agent, or Firm—Connolly Bove Lodge & Hutz LLP (57) ABSTRACT

A spindle motor for a hard disc drive including a motor base having a shaft, a rotor hub rotationally mounted on the shaft and loaded with an information recording disc, a ball bearing attached to an inner center side of the rotor hub for rotationally fixing the rotor hub on the shaft, and a conductive elastic member inserted between the rotor hub and the motor base to electrically contact each other.

3 Claims, 5 Drawing Sheets

SPINDLE MOTOR FOR HARD DISC DRIVE WITH STATIC CHARGE DISCHARGING

BACKGROUND OF THE INVENTION

1. Field of the Invention

The present invention relates to a spindle motor for a hard disc drive (hereinafter referred to as "HDD") having a structure to protect a magnetic head incorporated in the HDD from electrostatic discharge.

2. Description of the Related Art

Recently, a computer product incorporating an HDD becomes smaller in size and larger in capacity. In this sense, a spindle motor for an HDD also becomes smaller in size and operates in high precision and reliability.

Figure 7:
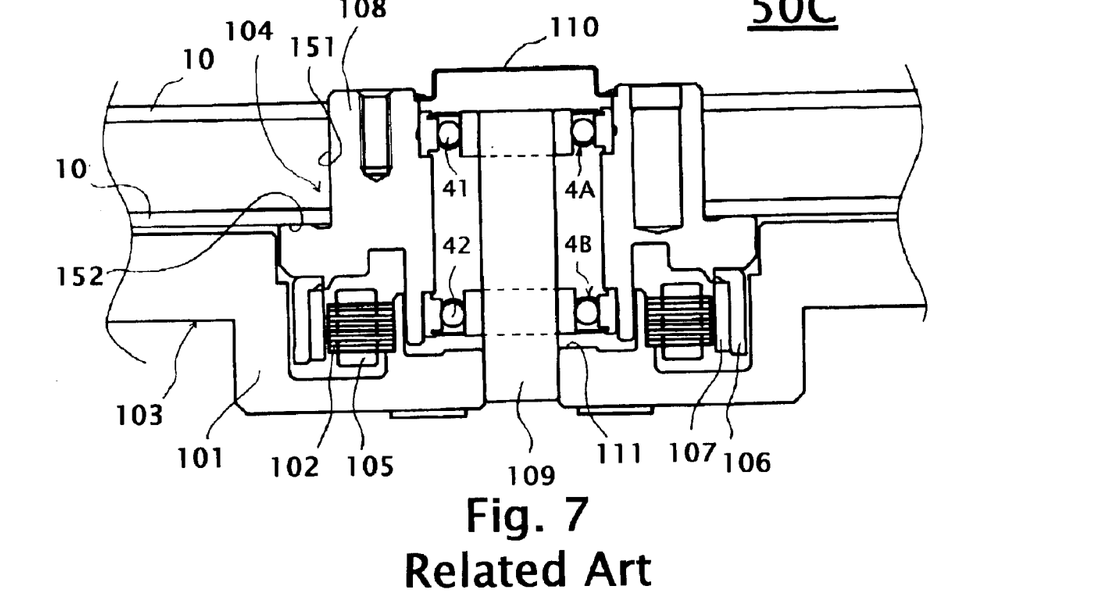
FIG. 7 is a cross sectional view of a spindle motor in accordance with the related art.

FIG. 7 is a cross sectional view of a spindle motor for HDD. In FIG. 7, a spindle motor 50C for an HDD is basically composed of a stator 103 having a motor base 101, a shaft 90 standing on the motor base 101, a rotor hub 108 rotationally attached to the shaft 90, a stator core 102 having a plurality of prominence poles winded with a driving coil 105 and fixed on the motor base 101.

Figure 8:
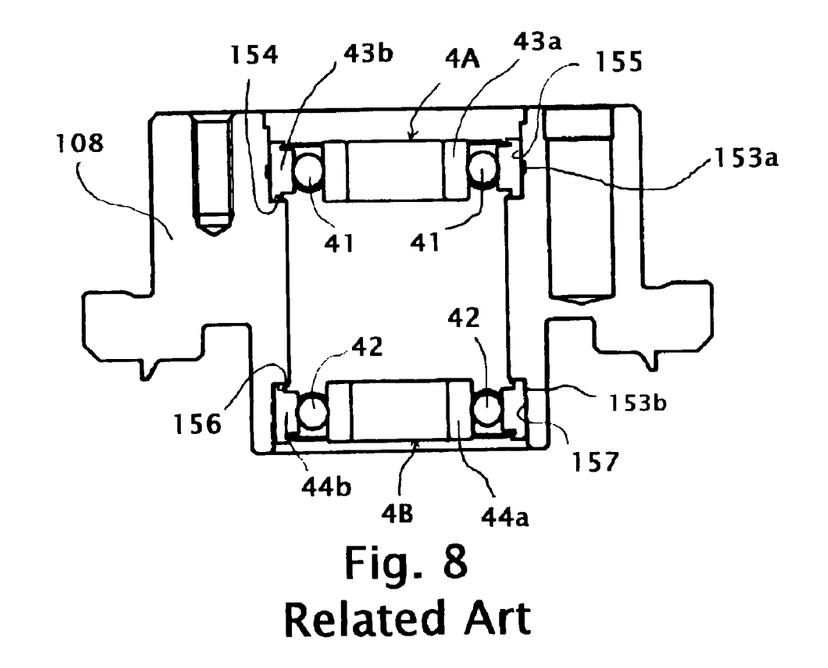
FIG. 8 is a cross sectional view of a ball bearing being inserted in a rotor hub in accordance with the related art.

The rotor hub 108 is fixed with a cylindrical shaped rotor yoke 106 on the bottom portion. A cylindrical ring magnet 107 is fixed in the inner circumference of the rotor yoke 106. FIG. 8 is an enlarged cross sectional view of the rotor hub incorporating a pair of ball bearing shown in FIG. 7. In FIG. 8, the rotor hub 108 has an upper circumference portion 155 and a lower circumference portion 157. Each upper and lower circumference portion has adhesive-grooves 153a and 153b respectively. The upper circumference portion 155 has ball bearing 4A pressed and fixed therein. The lower circumference portion 157 has ball bearing 4B pressed and fixed therein.

The rotor hub 108 also has a cylindrical portion 151 and a flange 152 for fixing a position of a magnetic recording disc 10. The cylindrical ring magnet 107 is placed in a position opposed to the outer circumference of the plurality of prominence poles (not shown) of the stator core 102 in predetermined distance.

The pair of ball bearings 4A and 4B makes smooth rotation of the rotor hub 108 and placed between the shaft 9 and the rotor hub 108. The ball bearing 4A is incorporated with a stainless steel ball 41 and the ball bearing 4B is incorporated with a stainless steel ball 42.

As shown in FIG. 7, the motor base 101 has a circular protrusion 111, which holds the shaft 109.

The spindle motor 50C is also composed of a cap 110, which prevents oil and dust inside the motor from leaking out on the surface of the magnetic recording disc 10. The rotation of the rotor 108 is controlled by switching power supply to the driving coil 105 wounded in the stator core 102.

In FIG. 8, the ball bearings 4A and 4B are pressed into the upper circumference portion 155 and lower circumference portion 157 applied with adhesive. The ball bearing 4A has an outer portion 43b and the ball bearing 4B has an outer portion 44b. The outer portions 43b and 44b fit respectively with step portions 154 and 156 formed in the inner side of the rotor hub 108. The ball bearings 4A and 4B fit inside the rotor hub 108 by the adhesive.

Figure 9:
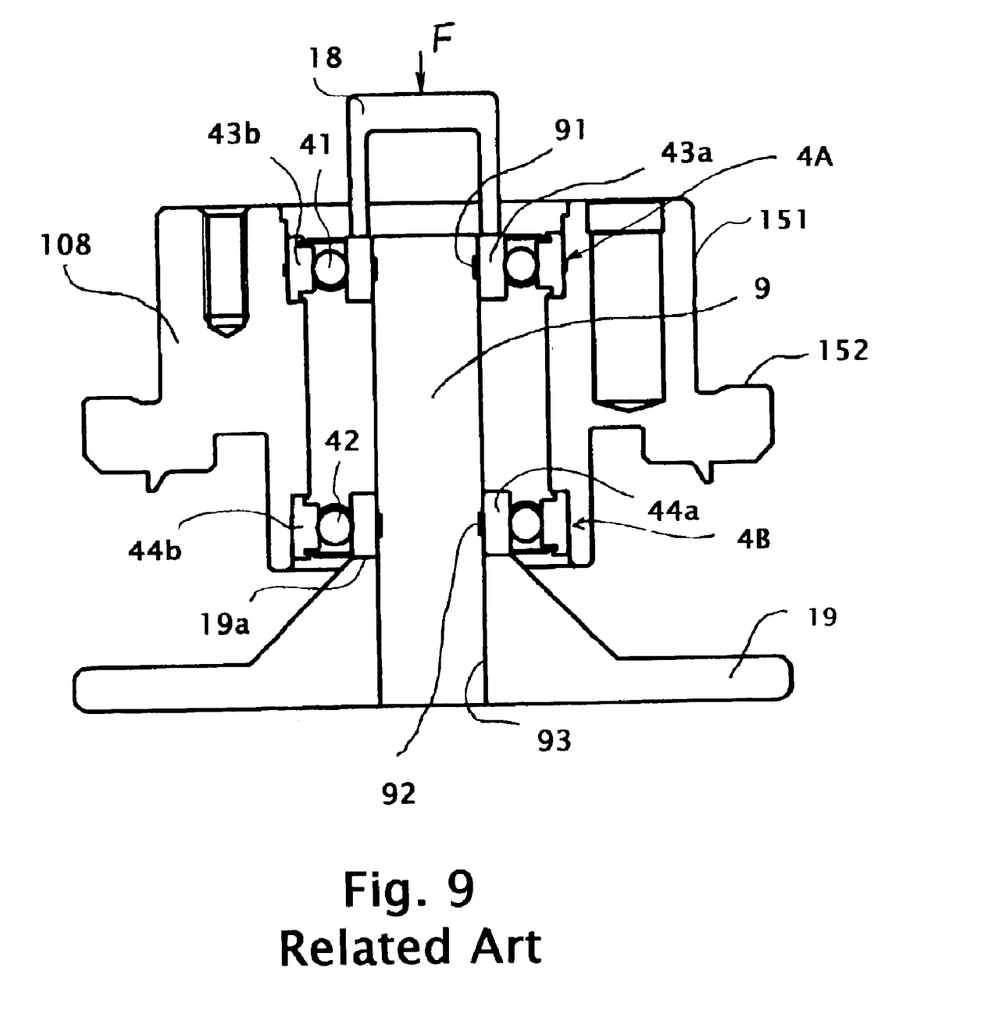
FIG. 9 is a cross sectional view of assembling a shaft into the rotor hub having the ball bearing in accordance with the related art.

FIG. 9 is a cross sectional view of the rotor hub incorporating a pair of ball bearings and a shaft. In FIG. 9, the shaft 9 having grooves 91 and 92 is applied with adhesive. Then the shaft 9 is stabilized by a stand 19, and is inserted in the center of the rotor hub 108 by a jig 18 with force F towards the direction of an arrow shown in FIG. 9. When the adhesive become solid in the grooves 91 and 92, and in the outer portions 43b and 44b, the shaft 9 is rotationally fixed with the rotor hub 108. The adhesive is also cured in inner portions 43a and 44a in opposite side of the outer portions 43b and 44b.

After the adhesive is cured, the shaft 9 is taken out from the stand 19. Then the adhesive is applied to the lower portion 93 of the shaft 9. The lower portion 93 is inserted into the circular protrusion 111 formed in the motor base 101.

As mentioned above, a recent HDD is required to have high recording density and capacity. In order to provide such an HDD, the revolution of the HDD should be higher and a recording/reproducing head (not shown) should be small as possible. As for the recording/reproducing head of HDD, an MR (Magneto-Resistive) head or a G-MR (Giant-Magneto-Resistive) head is substituted for an MIG (Metal in Gap) head to comply with the high capacity HDD. However, such the MR head or G-MR head is easily damaged by electrostatic discharge.

In addition, the gap between the head and the magnetic recording disc became dozens of nanometers to a few nanometers, which provides even more large electrostatic charges easily. For example, the conductivity of the flange 152 and outer portion 43b are kept below a few ohms because they are pressed by the shaft 9. The conductivity of the outer portions 43b and 44b, and the inner portions 43a and 44a are kept under a few ohms when the motor remains still, and become a few mega ohms when the rotates.

As the ball bearings 4A and 4B, and the shaft 9 are fixed with keeping clearance of 3 to 7 $\mu$m by the adhesive filled in the clearance, the ball bearings 4A and 4B and the shaft 9 could not have sufficient conductivity unless they directly contact with each other.

The rotor hub 108 is made of Aluminum material, the outer portions 43b and 44b of the ball bearing, the stainless steel balls 41 and 42, and the inner portions 43a and 44a are made of conductive metal and contact with each other that static electricity may pass through. However, the inner portions 43a and 44a, and the shaft 9 are fixed with clearance of 3 to 7 $\mu$m and the adhesive is filled in the clearance, static electricity can not be discharged through the motor base 101.

Consequently, the charged voltage becomes higher so that the static electricity may pass through the head and destroy it.

In consideration of the above problem, the shaft 9 may be pressed into the inner portion 43a and 44a to directly contact with each other to discharge static electricity. However, this construction may affect the orbital plane of the ball bearing that NRRO (Non Repeatable Run Out) may be deteriorated.

Accordingly, the electrostatic discharge causes the destruction of the head and the related art described above can not solve this problem.

SUMMARY OF THE INVENTION

Accordingly, in consideration of the above-mentioned problems of the related art, an object of the present invention is to provide a spindle motor for hard disc drive including a motor base having a shaft; a rotor hub rotationally mounted on the shaft and loaded with an information recording disc; a pair of ball bearings attached to the inner center side of the rotor hub for rotationally fixing the rotor hub on the shaft;

and a conductive elastic member for being inserted concentric to the shaft between the inner edge portion of the ball bearing and the motor base to electrically contact with each other towards the direction of the shaft.

Other object and further features of the present invention will be apparent from the following detailed description when read in conjunction with the accompanying drawings.

DETAILED DESCRIPTION OF THE PREFERRED EMBODIMENTS

[First Embodiment]

Figure 1:
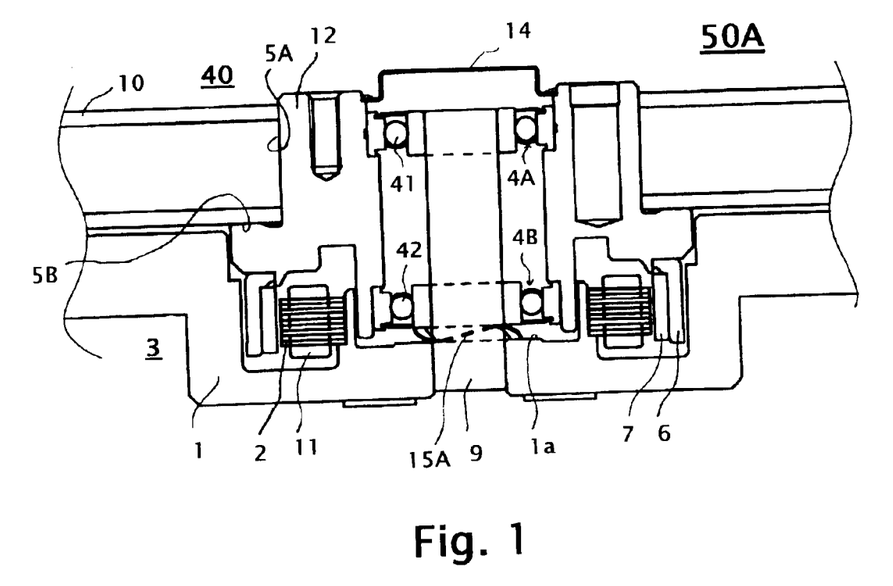
FIG. 1 is a cross sectional view of a spindle motor in accordance with a first embodiment of the present invention.

FIG. 1 is a cross sectional view of a spindle motor in accordance with a first embodiment of the present invention. In FIG. 1, a spindle motor 50A for hard disc drive (hereinafter referred to as "HDD") is basically composed of a stator 3 and a rotor 40. The stator 3 has a motor base 1, a shaft 9 standing on the motor base 1, a rotor 40 rotationally attached to the shaft 9, a stator core 2 having a plurality of prominence poles winded with a driving coil 11 and fixed on the motor base 1.

The rotor 40 has a rotor hub 12 fixed with a cylindrical shaped rotor yoke 6 on the bottom portion. The rotor yoke 6 has a cylindrical ring magnet 7 fixed in the inner circumference. The rotor hub 12 has an upper circumference portion and a lower circumference portion. Each of upper and lower circumference portions has adhesive grooves. The upper circumference portion is pressed with ball bearing 4A and the lower circumference portion is pressed with ball bearing 4B.

The rotor hub 12 also has a cylindrical portion 5A and a flange 5B for fixing a position of a magnetic recording disc 10. The magnet 7 is fit in the position opposed to the outer circumference of the prominence pole of the stator core 2 in predetermined distance.

The pair of ball bearing 4A and 4B makes smooth rotation of the rotor hub 12 and placed between the shaft 9 and the rotor hub 12. The ball bearing 4A is incorporated with a stainless steel ball 41 and the ball bearing 4B is incorporated with a stainless steel ball 42. The ball bearing has an inner circumference portion and an outer circumference portion. In FIG. 1, a conductive elastic member 15A is inserted between the inner circumference portion of the ball bearing 4B and a top portion 1a of the motor base 1.

The spindle motor 50A is also composed of a cap 14, which prevents oil and dust inside the motor from leaking out on the surface of the magnetic recording disc 10. The rotation of the rotor is controlled by switching the driving coil 11 wounded in the stator core 2.

Figure 2:
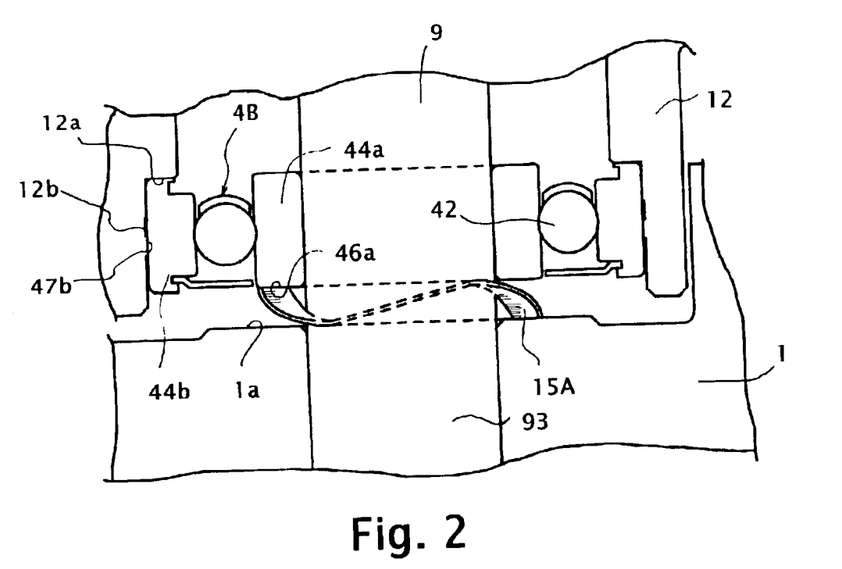
FIG. 2 is a cross sectional view of a substantial portion of the spindle motor shown in FIG. 1 where a conductive elastic member being inserted between a ball bearing and a motor base in accordance with the first embodiment of the present invention.

FIG. 2 is a cross sectional view of a substantial portion of the spindle motor shown in FIG. 1 where a conductive elastic member being inserted between a ball bearing and a motor base. A pair of ball bearings is assembled as follows. In FIG. 2, the adhesive is applied to the lower circumference portion of the rotor hub 12, and the ball bearing 4B is pressed into the rotor hub 12. The outer portion 44b of the bearing 4B fit with the corner shape of the upper circumference portion 47b of the rotor hub 12. An outer portion 44b of the ball bearing 4B contacts with the lower circumference portions 12a and 12b and the ball bearing 4B fits with the rotor hub 12. The ball bearing 4A is also inserted in the upper circumference portion of the rotor hub 12 (not shown) in the same manner as described for insertion of the ball bearing 4B to the rotor hub 12.

An adhesive groove is made on an inner portion 44a of the ball bearing 4B. The shaft 9 is applied with the adhesive and pressed into the center of the rotor hub 12. After the adhesive applied to the inner and outer portions of the ball bearings 4A and 4B fit with the shaft 9, the bottom portion of the shaft 93 is inserted to the motor base 1.

The shaft 9 attached to the rotor hub 12 is then inserted into the motor base 1. In FIG. 2, the conductive elastic member 15A is a washer in a ruffled shape and is inserted between the ball bearing 4B and the motor base 1. The washer 15A made of a conductive metal is located at the predetermined position by the jig not shown and fits between a bottom side 46a of the inner portion 44a of the ball bearing 4B and the top portion 1a of the motor base 1.

As the washer 15A is inserted between the rotor hub 12 and the motor base 1, the wave washer 15A discharges the static charge generated on the disc by the rotation of the spindle motor 50A through the motor base 1. Accordingly, the static charge generated is not discharged through the head (not shown) thereby preventing its destruction.

The clearance between the inner portion 44a of the ball bearing 4B and the shaft 9 is secured in 3 to 7 $\mu$m so that the orbital plane of the race of the ball bearing does not distort when the shaft 9 is pressed into the motor base 1. Accordingly, the NRRO (Non Repeatable Run Out) of the spindle motor 50A can be maintained in higher accuracy.

The rotor hub 12 is rotationally attached to the motor base 1 by the pair of the ball bearing 4A and 4B. The rotation of the rotor hub 12 is controlled by switching the driving coil 11 wound in the stator core 2.

Figure 3:
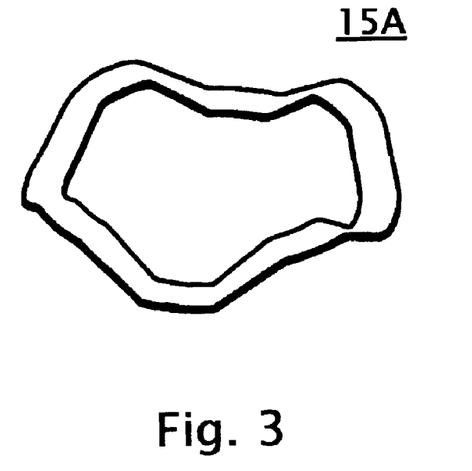
FIG. 3 is a perspective view of the conductive elastic member shown in FIGS. 1 and 2 in accordance with the first embodiment of the present invention.

FIG. 3 is a perspective view of the conductive elastic member shown in FIGS. 1 and 2 in accordance with the first embodiment of the present invention. The conductive elastic member 15A shown in FIG. 3 can be a washer in a ruffled shape that it is made of a stainless metal having the thickness of 0.06 mm.

[Second Embodiment]

Figure 4:
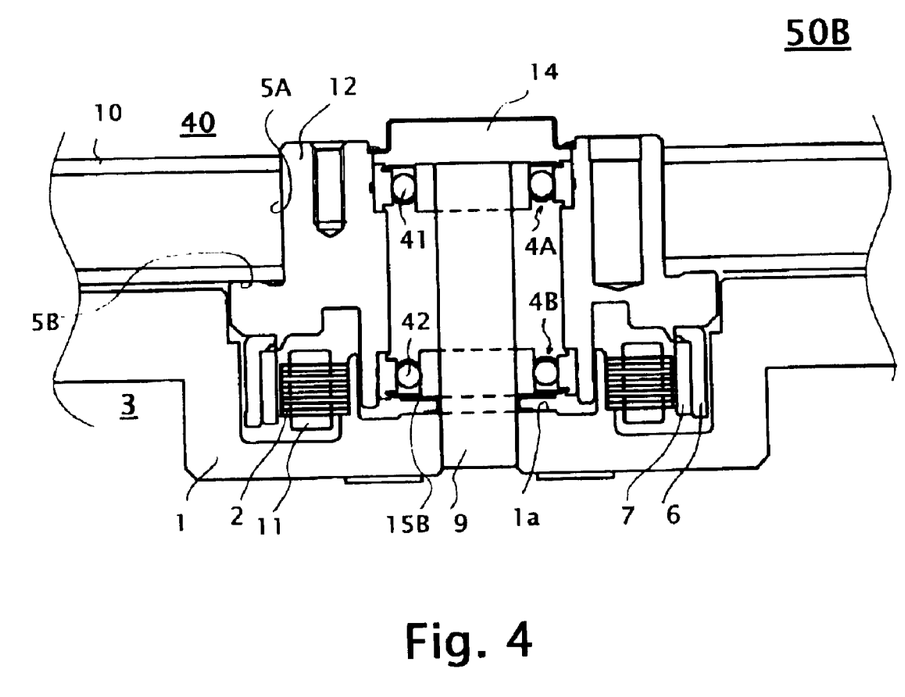
FIG. 4 is a cross sectional view of a spindle motor in accordance with a second embodiment of the present invention.

FIG. 4 is a cross sectional view of a spindle motor in accordance with a second embodiment of the present invention. In FIG. 4, a spindle motor 50B for HDD is identical to the spindle motor 50A of the first embodiment except for a conductive elastic member 15B. A conductive elastic member 15B is inserted between the bottom side 46a of the ball bearing 4B and the top portion 1a of the motor base 1.

Figure 5:
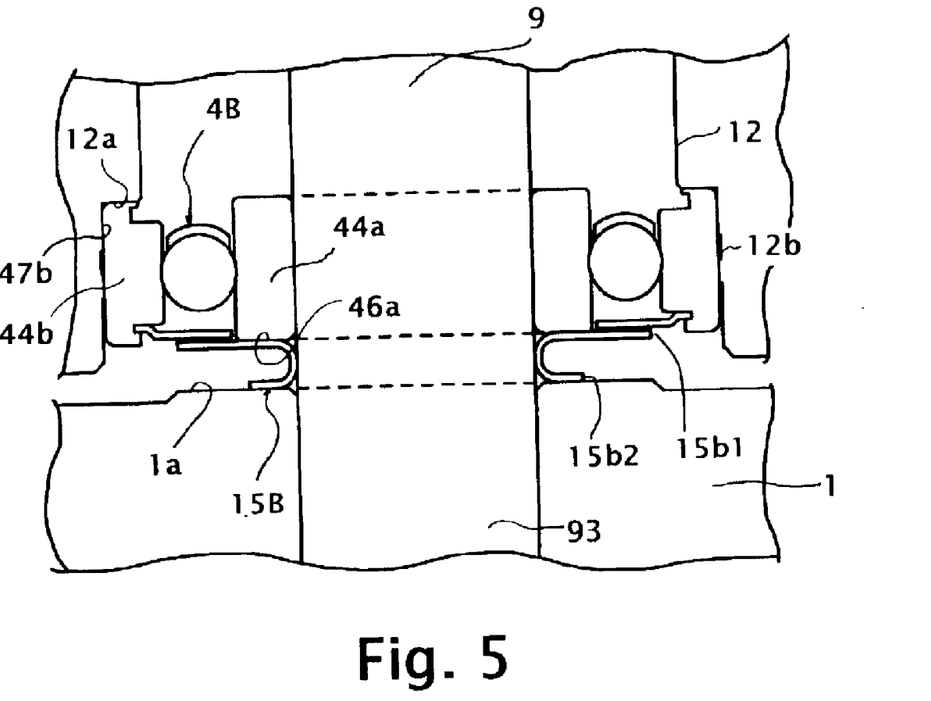
FIG. 5 is a cross sectional view of a substantial portion of the spindle motor shown in FIG. 4 partially enlarged for exhibiting a conductive elastic member inserted between a ball bearing and a motor base in accordance with the second embodiment of the present invention.
Figure 6:
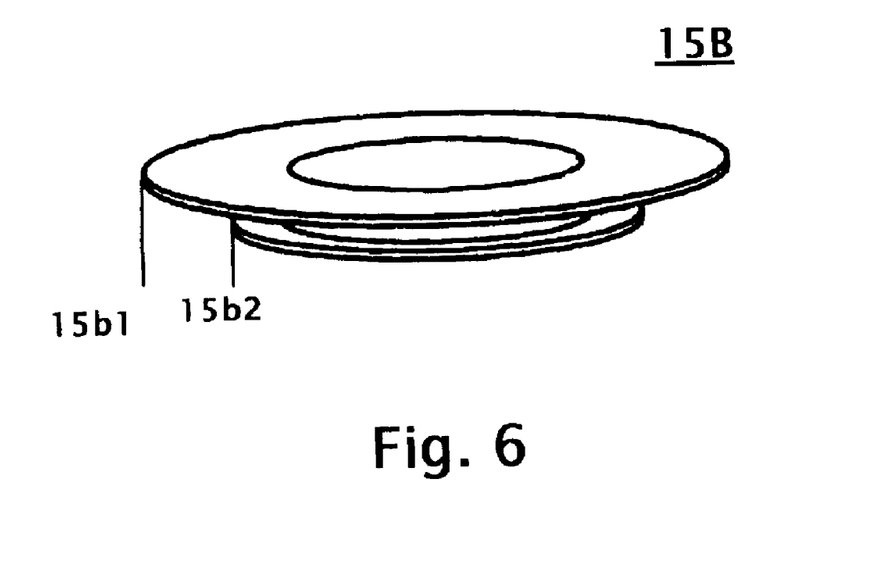
FIG. 6 is a perspective view of the conductive elastic member shown in FIGS. 4 and 5 in accordance with the second embodiment of the present invention.

FIG. 5 is a cross sectional view of a substantial portion of the spindle motor shown in FIG. 4 partially enlarged for exhibiting a conductive elastic member inserted between a ball bearing and a motor base in accordance with the second embodiment of the present invention. FIG. 6 is a perspective view of the conductive elastic member shown in FIGS. 4 and 5 in accordance with the second embodiment of the present invention. The conductive elastic member 15B is a ring washer made of conductive metal. It has a bigger diameter ring portion 15b1 and smaller diameter ring portion 15b2. For example, the ring washer 15B is made of stainless steel, and has bigger diameter of 10.3 mm, smaller diameter of 5 mm, and thickness of 0.06 mm.

According to the second embodiment, the stainless ring washer 15B is inserted between the motor base 1 and the ball bearing 4B towards the direction of the rotational axis. The electrostatic charge generated on the magnetic disc 10 is discharged through the motor base 1 that it will not be discharged through the head contiguous to the disc 10 so that the head is not affected or destroyed by the static charge.

Further, the inner portion 44a of the ball bearing 4B and the shaft 9 have a clearance of 3 to 7 $\mu$m and fit with the adhesive. In this sense, the orbital plane of the race of the shaft 9 does not deform even when the shaft 9 is pressed into the inner portion of the ball bearing. Consequently, the NRRO of the spindle motor 50B can be maintained.

As for the spindle motor described in the second embodiment, the ball bearings 4A and 4B are mounted in the rotor hub 12 in the same manner as described in the first embodiment. The adhesive is applied to the upper and lower circumference portions. The ball bearings 4A and 4B are pressed into the rotor hub 12 from the top and bottom respectively. The outer portion 44b of the bearing 4B fit with the corner shape of the upper circumference portion 47b of the rotor hub 12.

The inner portion 44a of the ball bearing 4B is applied with the adhesive. The shaft 9 is pressed into the center of the inner portion 44a.

After the adhesive applied to the inner and outer portions of the ball bearings 4A and 4B fit with the shaft 9, the bottom portion of the shaft 93 is inserted to the motor base 1. Upon inserting the shaft 9 to the motor base 1, the conductive elastic member 15B is inserted between the ball bearing 4B and the motor base 1. The elastic member is also called ring washer that it is positioned by a jig not shown and is fixed at the predetermined position by the adhesive.

The diameter of the ring washer 15B may be smaller than the diameter of the shaft 9 so that the ring washer 15B is pressed into the shaft 9 to be strongly engaged with each other.

The second embodiment provides a cap 14 as shown in FIG. 4, on the top of the spindle motor 50B. The cap 14 prevents oil or dust coming out from the motor by the rotation of the rotor hub 12 on the motor base 1 and protects the magnetic disc mounted on the rotor hub 12. The rotor hub 12 is rotationally connected with the shaft 9 by the pair of ball bearings 4A and 4B. The rotation of the rotor hub 12 is controlled by switching electricity for the driving coil 11 wounded in the stator core 2. For example, the revolution of the spindle motor is kept in 5,400 rpm.

As described above, the spindle motor in accordance with the present invention provides the spindle motor having the motor base which supports the rotor hub rotationally connected with the shaft mounted on the motor base, the yoke applied to the hub, the magnet applied to the yoke, the core fixed on the motor base to keep predetermined distance from the magnet, wherein the core is wound with the coil.

The conductive elastic member is inserted between the rotor hub and the motor base wherein the elastic member electrically contacts with the inner portion of the ball bearing and the side surface of the motor base, so that the electrostatic charge of the magnetic disc is discharged through the motor base and the head of the HDD is not destroyed.

Further, as the ball bearing is fixed to the shaft with clearance of 3 to 7 $\mu$m, the shaft does not deform to change the orbital plane when it is pressed into the ball bearings so that the high NRRO is maintained.

As described above, the present invention provides a stainless washer in a ruffled shape as a conductive elastic member, so that the washer is stabilized to electrically contact with the rotor hub and the motor base. Accordingly, unnecessary static charge is discharged through the washer and the motor base that the head is protected from the static charge.

As described above, the present invention provides a stainless ring washer having an outer diameter bigger than the inner portion of the ball bearing and smaller than the outer portion of the ball bearing so that the washer protects oil and dust coming out from the rotational portion of the spindle motor.

The washer described above may be a wave washer or a washer in a bent shape or incurvated shape.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. A spindle motor for a hard disc drive having a magnetic recording disc comprising:

a motor base having a shaft;

a rotor hub rotationally mounted on the shaft for fixing the magnetic recording disc;

a pair of ball bearings attached to the inner center side of the rotor hub for rotationally fixing the rotor hub on the shaft, wherein the inner portions of the ball bearings and the shaft are fixed with clearance, and adhesive fills in the clearance; and a conductive elastic member inserted concentrically with the shaft, between the inner edge portion of the ball bearing and the motor base to electrically contact each other towards the direction of the shaft;

wherein said conductive elastic member discharges a static charge generated on the magnetic recording disc due to rotation of the spindle motor.

2. The spindle motor as claimed in claim 1, wherein the conductive elastic member is made of a stainless metal and is a washer in a ruffled shape.

3. A spindle motor comprising:

a motor base having a shaft;

a rotor hub rotationally mounted on the shaft;

a pair of ball bearings attached to the inner center side of the rotor hub for rotationally fixing the rotor hub on the shaft; and a conductive elastic member inserted concentrically with the shaft, between the inner edge portion of the ball bearing and the motor base to electrically contact each other towards the direction of the shaft;

wherein the conductive elastic member is a ring washer made of stainless metal, and the outer diameter on the side that contacts the inner edge portion of the ball bearing is wider than the outer diameter on the side that contacts the motor base.

* * * * *

UNITED STATES PATENT AND TRADEMARK OFFICE
CERTIFICATE OF CORRECTION

PATENT NO. : 6,844,642 B2
DATED : January 18, 2005
INVENTOR(S) : Tomoyuki Tashiro It is certified that error appears in the above-identified patent and that said Letters Patent is hereby corrected as shown below:

Title page,
Item [30], please add, -- [30], Foreign Application Priority Data Aug. 10, 2001 (JP) 2001-243499 --

Signed and Sealed this

Seventeenth Day of May, 2005

JON W. DUDAS
*Director of the United States Patent and Trademark Office*